Sept. 14, 1965    A. M. WRIGHT    3,205,655
AFTERBURNER FUEL REGULATOR RESPONSIVE TO COMPRESSOR
DISCHARGE ABSOLUTE PRESSURE
Filed Oct. 7, 1957    3 Sheets-Sheet 1
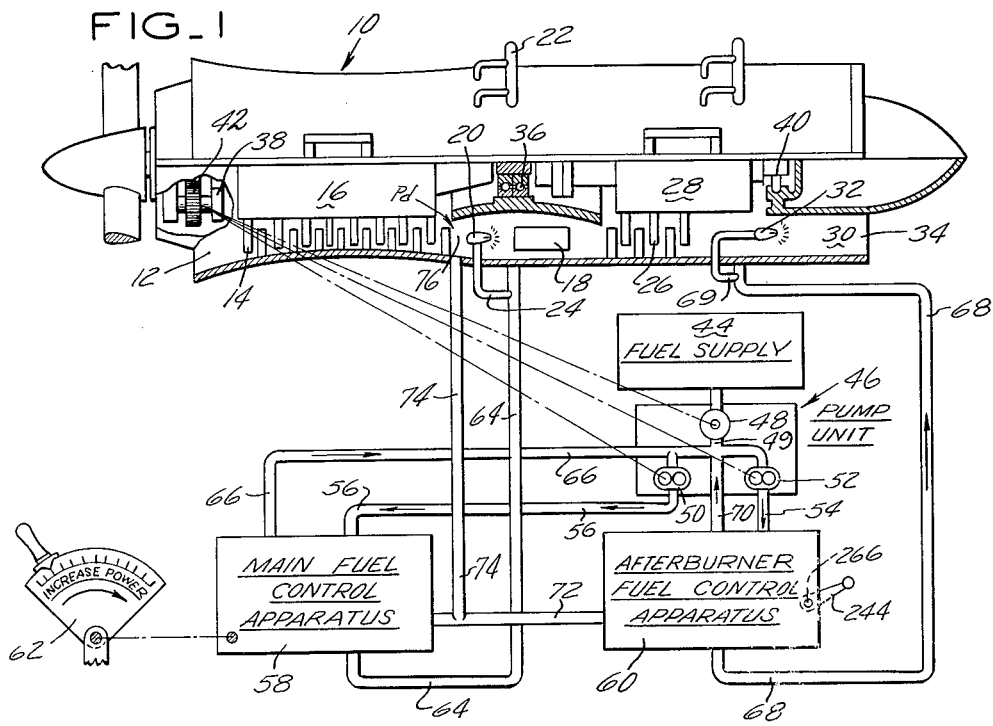
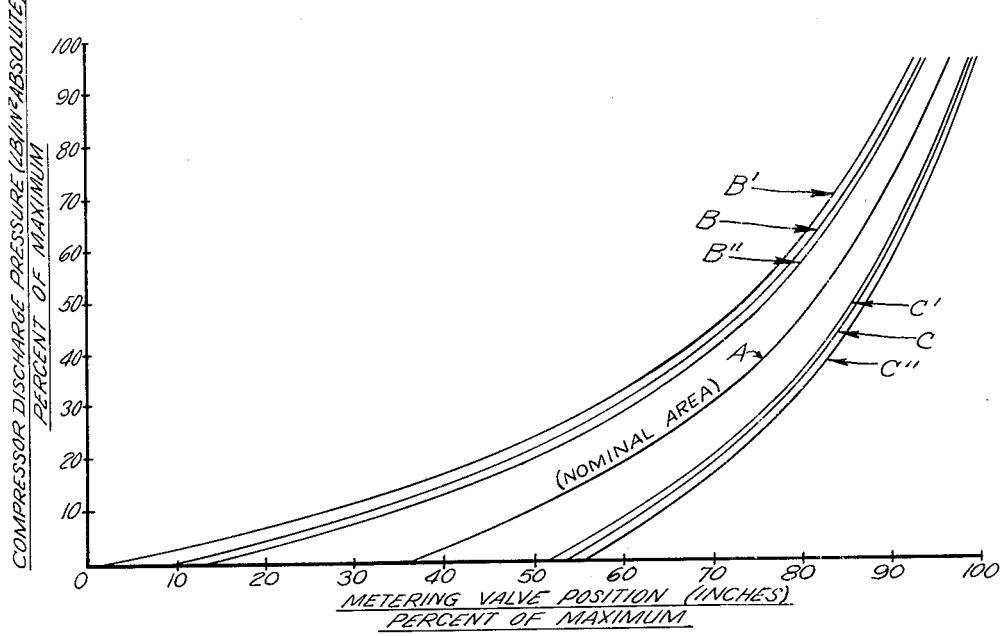
INVENTOR
A. M. WRIGHT
BY
ATTORNEY United States Patent Office 3,205,655
Patented Sept. 14, 1965

3,205,655
AFTERBURNER FUEL REGULATOR RESPONSIVE TO COMPRESSOR DISCHARGE ABSOLUTE PRESSURE
Alexander M. Wright, West Hartford, Conn., assignor, by mesne assignments, to Chandler-Evans Inc., West Hartford, Conn., a corporation of Delaware
Filed Oct. 7, 1957, Ser. No. 688,459
4 Claims. (Cl. 60—35.6)

This invention pertains to fuel control apparatus for turbojet engines suitable for jet-propulsion of aircraft, and more particularly has reference to fuel control apparatus for such engines which comprise a gas turbine, for supplying part of the propulsion power of the engine, and a supplementary combustion chamber, on the discharge side of said turbine, for reheating the exhaust gases from said turbine to increase the jet reaction thrust of the engine when maximum power output is desired.

Engines of this type usually comprise, as principal elements, an air inlet, an air compressor, one or more main combustion chambers having a series of burner nozzles through which the main fuel supply is fed, a gas turbine, a supplementary combustion chamber also having a series of burner nozzles through which the supplementary fuel supply is fed, and a tail pipe for discharging the combustion gases to the atmosphere in the form of a jet. Associated with the engine are a main fuel supply system, including a fuel pump and control apparatus, for delivering fuel to the main combustion chambers, and a supplementary fuel supply system, including a fuel pump and control apparatus, for delivering fuel to the afterburners in the afterburner combustion chamber. This invention is particularly concerned with the afterburner fuel control apparatus which controls the afterburner fuel flow as a preselected function of the compressor discharge absolute pressure.

The maximum power output of an engine of the type referred to can be greatly increased by the use of an afterburner combustion chamber to reheat the exhaust gases from the turbine and thus augment the propulsive power of the jet of exhaust gases discharged into the atmosphere. This increased power output is particularly beneficial when the aircraft is taking off from the ground, when climbing at a rapid rate and when maximum speed is required in maneuvering. However, when an afterburner combustion chamber is employed, it is essential that the reheating of the turbine exhaust gases, as well as the fuel flow to the main combustion chamber, be regulated in accordance with the rate of mass air flow through the engine, as measured by the compressor discharge absolute pressure.

Modern aircraft engines, especially of the turbojet type are required to meet rigid standards of performance and reliability under an extremely wide range of operating conditions that impose many severe requirements which a satisfactory afterburner fuel control must meet.

Objects of this invention are:

(1) To provide an improved afterburner fuel control apparatus, associated with the main fuel control apparatus of the engine, in which the delivery of fuel to the afterburners is regulated in accordance with the foregoing requirements.

(2) To provide an improved fuel control apparatus having novel means for closely regulating the afterburner fuel flow in accordance with a prescribed function of the absolute discharge pressure of the compressor.

(3) To provide an improved afterburner fuel control having means for adjusting its metering schedule to meet the operating requirements of the model and the particular engine on which it is used.

(4) To provide an improved afterburner fuel control apparatus having means whereby an error in positioning its fuel metering valve will produce approximately the same percentage error at all points along its metering curve throughout its operating range.

(5) To provide an improved afterburner fuel control apparatus having means for recirculating fuel not required for the afterburner back to the main fuel supply tank to prevent detrimental rise in temperature when the control apparatus is idle.

With these and other objects in view which may be incident to my improvements, my invention consists in the combination and arrangement of elements hereinafter described and illustrated in the accompanying drawings, in which:

FIGURE 1 shows, somewhat diagrammatically, a turbojet aircraft engine with its associated main fuel supply system and afterburner fuel supply system, including my improved control apparatus, together with the principal connections therebetween.

FIGURES 3, 4 and 5 are diagrams showing certain operating characteristics of the apparatus shown in FIGURE 2.

Figure 2:
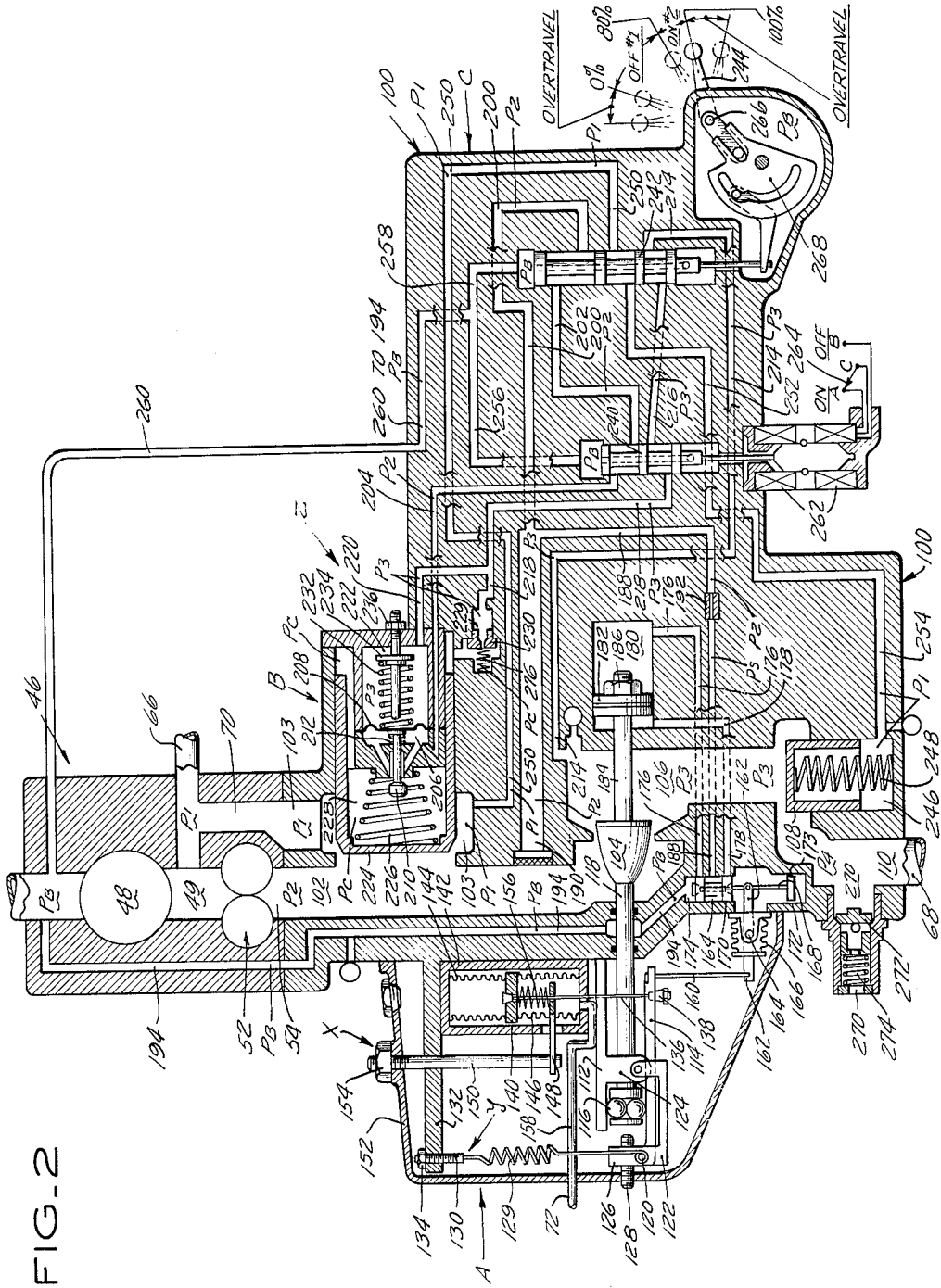
FIGURE 2 is a vertical, sectional view, partly diagrammatic, of my improved afterburner fuel control apparatus.

Broadly comprehended, my improved afterburner fuel control comprises a fuel by-pass valve which maintains a constant metering head across a variable-area, fuel metering valve; a metering valve and its positioning mechanism which varies the flow area through said valve as a preselected function of the compressor discharge absolute pressure; and a shut-off valve, actuated by a solenoid and by a manual transfer valve, which cuts off all fuel flow to the afterburners when not in operation.

The by-pass valve maintains a constant metering head across the metering valve by means of an element which senses variations in metering head and moves the by-pass valve to make correction.

The desired afterburner fuel flow is obtained by controlling the flow area of the metering valve. This is accomplished by a servo valve and piston arrangement where the servo valve is moved by changes in compressor discharge absolute pressure and directs the piston to change the position of the pivot point of a "nutcracker" amplifier, to change the moment of a spring to balance the new force on the nutcracker levers. By this nutcracker amplifier, a small movement of a bellows, subject to compressor discharge absolute pressure, is amplified and transmitted to said metering valve. The flow area of the metering valve thus becomes a preselected function of the compressor discharge absolute pressure. Fuel under pressure controlled by the by-pass valve is used to actuate this servo system.

Referring now to the drawings, in FIGURE 1, there are shown the principal elements of the engine above referred to, comprising: a supporting casing 10, an air inlet 12, a multistage air compressor 14 with its rotor shaft 16, one of a number of main combustion chambers 18, one of a corresponding number of main fuel burner nozzles 20, connected to a generally circular fuel manifold 22 by means of a conduit 24, a multistage turbine 26 with its rotor shaft 28 connected to compressor rotor shaft 16; an afterburner combustion chamber 30, a plurality of afterburner fuel nozzles 32, a tail pipe 34 for discharging combustion exhaust gases to the atmosphere; a center bearing 36 and end bearings 38 and 40 supported by casing 10, and a gear train 42 connected to shaft 16 for rotating the fuel pumps and other accessories at a speed proportional to engine speed.

The main fuel supply system to the engine includes a fuel supply tank 44 connected to a fuel pump unit 46 comprising a centrifugal pump 48, connected by a conduit 49 in series with a pair of parallel, positive displacement (e.g., gear) pumps 50 and 52, which supply fuel through, conduits 54 and 56 respectively, to a main fuel control apparatus 58, and an afterburner fuel control apparatus 60. All three pumps 48, 50 and 52 are connected to gear train 42, whereby they are driven at a speed proportional to engine speed. Fuel, at a rate controlled by a pilot's manual control 62, is supplied by main fuel control 58 through conduits 64 and 24 to nozzles 20 in the main combustion chamber 18 for the operation of turbine 26; and fuel not required by said turbine is returned from main fuel control 58, through a conduit 66, to conduit 49 on the inlet side of pump 50. Similarly, fuel at a regulated rate is supplied by the afterburner fuel control 60, through conduits 68 and 69, to afterburner nozzles 32; and fuel not required for afterburning is returned from afterburner fuel control 60, through a conduit 70, to conduit 49 on the inlet side of pump 52. Both the main and afterburner fuel controls are connected by conduits 72 and 74 with the compressor discharge chamber 76, whereby the fuel supplied by both controls is automatically regulated solely in accordance with the rate of mass air flow through the engine, as measured by the compressor discharge absolute pressure ($P_d$) in chamber 76.

Since one of the cardinal features of applicant's invention is regulation of the fuel flow to the main combustion chamber and the afterburner, in accordance with the rate of mass air flow through the engine, and since compressor discharge absolute pressure is a measure of said air flow, it is essential that said pressure be the sole control parameter that automatically regulates said fuel flow, because any modification of said pressure would cause said fuel flow to be not in accordance with said air flow. Since applicant's invention is particularly concerned with apparatus for regulating the fuel flow to the afterburner, and the main fuel control apparatus is involved only to the extent that it cooperates in association with the afterburner control apparatus (as shown in FIG. 1), the details of construction of the main control apparatus forms no part of applicant's invention, beyond the arrangement whereby (as shown in FIG. 1), it automatically regulates the fuel flow to the main combustion chamber, in accordance with same control parameter as the afterburner fuel control (i.e., compressor discharge absolute pressure). Accordingly, the details of construction of the main fuel control apparatus will not be further described herein since they may be any combination and arrangement of elements that operate to regulate the fuel flow to the main combustion chamber in accordance with the compressor discharge absolute pressure, as for the example of a combination and arrangement of pertinent elements similar to those of the afterburner fuel control apparatus, as hereinafter described, and illustrated in the drawings.

Referring to FIGURE 2, the afterburner fuel control, indicated at 60 in FIGURE 1, comprises a hermetically-sealed casing 100 which incloses all of the working parts of the control. As shown in FIGURE 2, the pump unit 46 (of FIG. 1) is mounted directly upon the top of casing 100, so that connecting conduits 54 and 70 (of FIG. 1) are replaced by passages 54 and 70 in pump unit 46. For simplicity of illustration pump 50, which supplies fuel to the main fuel control 58, is omitted in FIGURE 2. Fuel under inlet pressure ($P_2$) enters casing 100 through a passage 102 which is a continuation of passage 54 in pump unit 46; and fuel not required for afterburning is returned to passage 49 in pump unit 46, through a passage 103 which connects with passage 70 in pump unit 46. The intermediate pressure ($P_1$) in passages 49, 70 and 103 is the discharge pressure of pump 48.

From passage 102 fuel flows past metering valve 104 to passage 106, whereby its pressure is reduced from ($P_2$) to ($P_3$). From passage 106 the metered fuel flows past a shut-off valve 108 to passage 110, whereby its pressure is reduced to discharge pressure ($P_4$) until valve 108 is in its wide open position, whereupon the pressure ($P_4$) becomes the same as pressure ($P_3$). From passage 110 fuel flows through conduit 68 to afterburner nozzles 32.

The afterburner fuel control shown in FIGURE 2 comprises three principal parts: (A) a metering head controller which maintains a constant metering head ($P_2$–$P_3$) across metering valve 104 whose flow area is varied as a preselected function of compressor discharge absolute pressure ($P_d$); (B) a nutcracker amplifier which positions metering valve 104; and (C) an actuating device which controls shut-off valve 108.

In the nutcracker amplifier are two tracks: a fixed track 112 which is rigidly attached to casing 100, and a movable track 114 which pivots about a pair of rollers 116, mounted in a cage on the left end of a stem 118 of valve 104. The left end of track 114 is pivoted at 120 to a floating yoke 122, whose right end is pivoted to a depending lug 124 integral with fixed track 112. The left end of yoke 122 terminates in an upwardly-projecting, bifurcated arm 126 which bestrides a pin 128 which is adjustably mounted in the side wall of the amplifier A and serves as a minimum fuel flow stop, by limiting the leftward travel of valve stem 118 and valve 104. The left end of movable track 114 is biased upwardly by a tension spring 129, whose lower end is attached to pivot pin 120 on yoke 122, and whose upper end is attached to a pin 130 which is slidably mounted in a flange wall 132 integral with casing 100. The upper end of pin 130 is threaded for engagement with an adjusting nut 134, whereby the tension of spring 129 may be adjusted as desired.

The right end of movable track 114 is supported by a rod 136, whose lower end is adjustably connected to track 114 by a threaded nut 138, and whose upper end is attached to a rigid circular disc 140 which is slidably mounted in a cylinder 142. Interposed between disc 140 and the top of cylinder 142 is an evacuated bellows 144, whose upper end is fixed to the top of cylinder 142, and whose lower end is attached to disc 140. An annular bellows 146 is similarly interposed between the bottom wall of cylinder 142 and disc 140. The left side of cylinder 142 and bellows 146 are recessed for the reception of an arm 148 which is fixed to the lower end of a rod 150 that is slidably mounted in flange wall 132 and top wall 152 of amplifier A. The upper end of rod 150 terminates in a threaded portion which is engaged by an adjusting nut 154, whereby the vertical position of rod 150 and arm 148 may be adjusted as desired. Within the central space in annular bellows 146, and interposed between arm 148 and disc 140, is a spring 156 whose compression is determined by the position of rod 150 and arm 148. The interior of bellows 146 is connected by conduits 158 and 72 to compressor discharge chamber 76 (FIG. 1), so that the position of disc 140 and the right end of track 114 is determined by the compressor discharge absolute pressure ($P_d$) and the compression of spring 156.

The right end of track 114 is articulately connected by a link 160 to a lever 162 pivoted at 164 in a recess in a sealing bellows 166 whose right end is fixed to the wall of casing 100 and whose left end is sealed to lever 162. The right end of lever 162 is articulately connected to a rod 168 which is attached at its upper end to a servo valve 170 and at its lower end to a dashpot piston 172, which reciprocates in a cylinder 173 with sufficient clearance to permit restricted fuel flow around said piston. Servo valve 170 reciprocates in a cylinder 174 which is connected near its upper and lower ends by passages 178 and 176 respectively, with the left and right ends of a cylinder 180 in which is mounted a power piston 182 adjustably attached by a rod 184 and nut 186 to metering valve 104. The central portion of servo valve cylinder 174 is connected by passages 188 and 190 to passage 102. In passage 188 is a fixed restriction 192 which reduces the fuel pressure ($P_2$) in passage 190 to servo supply pressure ($P_s$) in cylinder 174.

With the above described arrangement of servo valve 170 and its connected elements, it will be noted that when said valve is in its neutral position (as shown in FIG. 2) its lands close passages 176 and 178, whereby piston 182 is locked in whatever position it then occupies; and when servo valve 170 is raised above its neutral position by the downward travel of the right end of track 114, fuel, under servo supply pressure ($P_s$), is admitted through passage 176 to the right end of cylinder 180, and at the same time, fuel escapes from the left end of cylinder 180 through passage 178 to the bottom of cylinder 174, and from thence; through a passage in the center of servo valve 170 and a passage 194 in casing 100 and pump unit 46, to the inlet side of pump 48. This escape of fuel from the left end of cylinder 180 reduces the pressure therein to the low pressure ($P_b$) on the inlet side of pump 48, and the admission of fuel under higher servo-supply pressure ($P_s$) to the right end of cylinder 180, moves the piston 182 and valve 104 to the left which reduces the flow area through said valve and the fuel flow to the afterburner nozzles 32. Similary, upward travel of the right end of track 114, lowers servo-valve 170 and causes piston 182 and valve 104 to move to the right and increases the flow area of said valve and the fuel flow to the afterburners.

Since an increase in compressor discharge absolute pressure ($P_d$) expands bellows 146 and raises disc 140 and the right end of track 114, which lowers servo valve 170, such increase in pressure ($P_d$) increases the fuel flow to nozzles 32, and vice versa, as described above.

When valve 104 is moved to the right by an increase in pressure ($P_d$), pivot balls 116 are also moved to the right which decreases the leverage of spring 156 and bellows 146, so that track 114 is restored to an equilibrium in its new position, corresponding to the increased compressor discharge absolute pressure ($P_d$). Thus piston 182 and valve 104 will move to the right until the moments acting on tract 114 are equal, and vice versa when valve 104 is moved to the left by a decrease in pressure ($P_d$).

While the nutcracker amplifier A moves valve 104 in accordance with changes in the value of the compressor discharge absolute pressure ($P_d$), as described above, the geometry of the amplifier A is such that the travel of metering valve 104 is a nonlinear function of the value of the pressure ($P_d$). Thus, a change of one pound per square inch (1.00 p.s.i.) at low values of the pressure ($P_d$) produces a greater movement of valve 104 than the same change at high values of the pressure ($P_d$), as is clearly indicated by the curve A in FIG. 3, which shows the metering valve position corresponding to various values of compressor discharge absolute pressure ($P_d$).

In order to control the metered fuel flow ($W_f$) in a satisfactory manner, the metering head ($P_2-P_3$) across the metering valve 104 must be maintained at a constant value. This is accomplished by the metering head controller B as follows. The fuel pressure ($P_2$) is sensed from passage 102, upsteam of the metering valve, and transmitted by passages 190, 200, 202 and 204 and chamber 206, to the left side of a diaphragm 208, which is connected to a poppet-type, servo valve 210, biased to closed position by a spring 212. The pressure ($P_3$), downstream of metering valve 104, is transmitted to the right side of diaphragm 208 by passages 106, 214, 216, 218, and 220 and chamber 222. Hence, diaphragm 208 is responsive to the metering head pressure differential ($P_3-P_2$), across metering valve 104. The pressure $P_2$, upstream of the metering valve 104, is determined by the amount of opening of a bypass valve 224, which is biased toward closed position by a spring 226 and the fuel in chamber 228 under a control pressure ($P_c$); said valve 224 being moved toward open position by the pressure ($P_2$) in passage 102. The control pressure ($P_c$) is the intermediate pressure between the variable orifice of servo valve 210 and a fixed orifice in an expediter valve 230.

When servo valve 210 is moved toward open position by diaphragm 208, increasing the size of the flow orifice therethrough, the control pressure in chamber 228 increases, which moves by-pass valve 224 toward closed position, decreasing the flow area therethrough and increasing the pressure ($P_2$); and vice versa. Since the force of pressure ($P_2$) acts on valve 224 in opposition to the combined force of the control pressure ($P_c$) in chamber 228 and the spring 226, the force of differential ($P_2-P_c$), actuating by-pass valve 224, is equal to the force of said spring. If there is a transient increase in the pressure ($P_2$), this is communicated to diaphragm 208 and said diaphragm moves to the right, reducing the opening of servo valve 210 and decreasing control pressure ($P_c$), whereupon by-pass valve 224 opens and reduces the increased ($P_2$) pressure to its original value.

In order to adjust the metering head differential ($P_2-P_3$) across valve 104 to obtain the desired fuel flow characteristics, a spring 232, having an adjustable abutment 234, is applied to diaphragm 208. The position of abutment 234 is adjusted by means of an adjusting nut 236 on the outside of casing 100, so that this adjustment can be made in the field, after the fuel regulator is applied to the engine and the engine is mounted in the aircraft and ready for flight. The purpose and function of this field adjustment will be further described hereinbelow.

The actuating device (C) for turning the afterburner fuel control on and off, comprises two transfer valves, one 240, operated electrically by a solenoid, and the other 242, operated manually by a pilot's control lever 244. These transfer valves, either separately or cooperatively, control the movement of shut-off valve 108 by admitting fuel under intermediate pressure ($P_1$) or pressure ($P_3$) into a cylinder 246, where said fuel acts on valve 108 in an upward direction, in opposition to the pressure ($P_3$) in passage 106. A spring 248, biasing valve 108 toward closed position, determines the value of the pressure differential (of the fuel in passage 106 and in cylinder 246) at which valve 108 opens.

In order for the afterburner fuel control to be operative, both the manual transfer valve 242, and the electrical transfer valve 240, must be in the "On" position, as shown in FIG. 2. If either valve is in its "Off" position, the afterburner regulator will be in the by-pass or inoperative condition. For the regulator to be operative, the pressures ($P_2$) and ($P_3$) must be directed to diaphragm 208, and the pressure in cylinder 246 reduced to ($P_1$) value, as shown in FIGURE 2. When valves 240 and 242 are in these "On" positions (as in FIG. 2), fuel under ($P_2$) pressure is directed to diaphragm 208 from passage 102 through passages 190 and 200, valve 242, passage 202, valve 240, passage 204 and chamber 206; and fuel under ($P_3$) pressure is directed to diaphragm 208 from passage 106, through passages 214, valve 242, passage 216, valve 240, passages 218 and 220 and chamber 222.

Thus, when valves 42 and 240 are in their "On" position, fuel under both pressures ($P_2$) and ($P_3$) pass through valve 242 to valve 240, while the pressure in cylinder 246 is vented to ($P_1$) pressure, and the pressure differential ($P_3-P_1$) acting on valve 108 overcomes the force of spring 248 and opens said valve.

In the "Off" position, valve 242 is down and fuel under both ($P_2$) and ($P_3$) pressures is stopped from going to valve 240, while both of the pressures ($P_2$) and ($P_3$) on diaphragm 208 are vented to the low pressure ($P_b$), on the inlet side of pump 48 through valves 240 and 242 and passages 256, 258, and 260. At the same time, the pressure ($P_1$) in cylinder 246 is raised to pressure ($P_3$), so that both the fuel pressures acting on valve 108 are equal (i.e., $P_3$) and spring 248 closes said valve, which shuts off all fuel flow to afterburner nozzles 32.

Valve 240 is actuated by a two coil solenoid 262 which is energized by closing a switch 264 to its "On" position, as indicated in FIG. 2, and deenergized by closing the switch to its "Off" position. Valve 242 is in its "On" position when up, and in its "Off" position when down. Valve 242 is operated by manual lever 244 through shaft 266, and a Geneva-lock mechanism and cam arrangement 268, so that the full operating travel of the valve 242 is obtained by one degree of motion of lever 244. Valve 240 acts in the same manner as valve 242, with the exception that no connection to valve 108 is involved. When valve 240 is raised to its up or "On" position (as in FIG. 2), fuel under ($P_3$) pressure flows through passages 218 and 220 to chamber 222, and also through passage 218 and the orifice in valve 230 to chamber 228. In order that chamber 228 may receive fuel as rapidly as chamber 222, the expediter valve 230 is provided. So long as the pressure in passage 218 exceeds the pressure in chamber 228, the pressure differential will open valve 230, against the force of a spring 276, which biases it toward closed position. The opening of valve 230 uncovers lateral ports 229 therein and permits rapid flow of fuel into chamber 228, but when the pressures in chamber 228 and passage 218 become equal, spring 276 closes ports 229 in valve 230 and brings the orifice in said valve into operation, as described hereinabove.

Connecting with fuel discharge passage 110 is a drain passage 270, wherein a drain valve 272, biased toward open position by a spring 274, drains off fuel under ($P_4$) pressure when the shut-off valve 108 closes. As long as valve 108 is open to any extent, the pressure ($P_4$) in passage 110 is always sufficient to overcome spring 274 and keep valve 272 closed.

Three adjustments, X, Y and Z, are provided for the control, as shown in FIGURE 2. Adjustment X, called the "Area Adjustment," comprises elements 148, 150 and 154, which add to, or subtract from, the load of spring 156 on bellows 144 and 146. This adjustment moves the curve of metered fuel flow ($W_f$) versus compressor discharge absolute pressure ($P_d$), in a parallel manner, and thus has the same effect as adding to, or subtracting from, the flow area through metering valve 104, as described in column 8, in connection with FIGURE 4.

Figure 4:
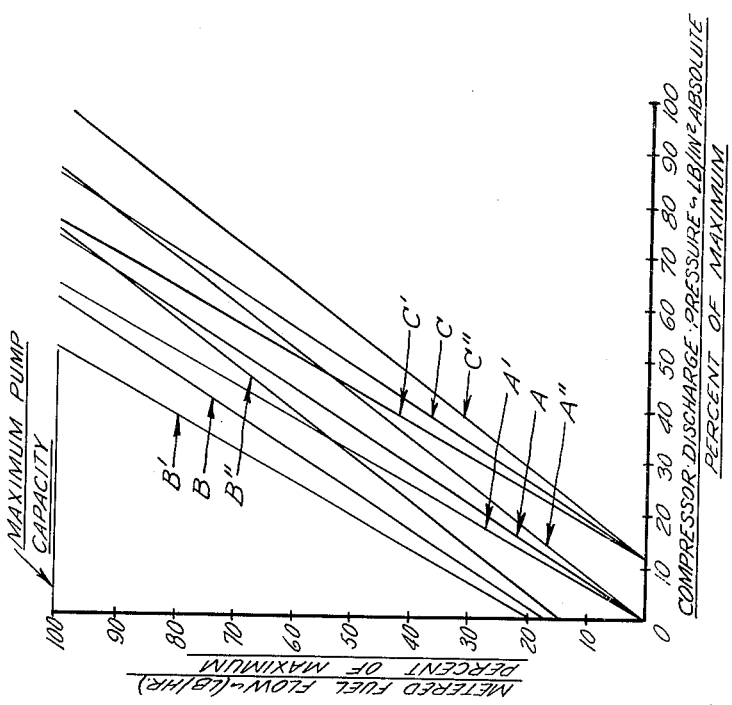

Adjustment Y, called the "Factory Slope Adjustment," comprises elements 130 and 134 which change the load of spring 129 acting on nutcracker track 114, which changes the slope of the metered fuel curve ($W_f$) versus compressor discharge absolute pressure ($P_d$), as described in column 8, in connection with FIGURE 4.

Adjustment Z, called the "Field Slope Adjustment," comprises elements 234 and 236, which add to, or subtract from, the load of spring 234 on diaphragm 208, thus correspondingly changing the metering head ($P_2-P_3$). This adjustment also changes the slope of the curve of metered fuel flow ($W_f$) versus compressor discharge absolute pressure in a manner similar to adjustment Y, but to a smaller degree.

The rate of mass air flow through a turbojet engine is a composite function of engine speed and the density of the air entering the engine, but since afterburners are generally operated only at or near maximum engine speed, the rate of mass air flow through the engine is essentially a linear function of the entering air density. Also, while the pressure and temperature determine the density of the circumambient air at any flight altitude, the effect of variations of atmospheric temperature and pressure from day to day are relatively small as compared to the variation of atmospheric density with variations in flight altitude. And since compressor discharge absolute pressure reflects the density of the air entering the engine, the value of said pressure, at any given engine speed, is essentially a linear function of flight altitude, and is an acceptable measure of the rate of mass air flow through the engine, for the regulation of afterburner fuel flow. The rate of metered fuel flow through an afterburner fuel regulator is therefore substantially a linear function of flight altitude.

Accordingly, the curve of metered fuel flow ($W_f$) versus compressor discharge absolute pressure is a straight line, as indicated by the line A in the graph of FIGURE 4, which shows the rate of metered fuel flow ($W_f$) versus compressor discharge absolute pressure ($P_d$), as varying from $W_f=0$, when $P_d=0$, to $W_f=$ a preselected maximum (lbs./hr.), when $P_d=$ a preselected maximum (p.s.i.a.). Since line A represents the metering curve of an afterburner fuel control, as a straight-line function of compressor discharge absolute pressure ($P_d$), from $W_f=0$ at $P_d=0$ to $W_f=$ a selected value when $P_d=$ a corresponding selected value, line A is called the "nominal" metering curve. If the particular engine on which the fuel control is to be used requires a greater rate of fuel flow at low altitudes, as for example, $W_f=33.33$ percent of maximum fuel flow, when the compressor discharge absolute pressure ($P_d$) is say 25 percent of maximum, p.s.i.a., as indicated by line B of FIG. 4, the metering curve of the fuel control can be moved from line A to parallel line B, by tightening the nut 154 of the Area Adjustment X, as mentioned in column 7 above. Similarly, if the particular engine requires a smaller rate of fuel flow, say $W_f=0$, when $P_d=25$ percent of maximum, p.s.i.a., the metering curve can be moved from line A to parallel line C, by loosening the nut 154 of Area Adjustment X. These adjustments are bench test adjustments which are made at the factory.

Again a particular engine may require a proportionally higher or lower rate of increase in metered fuel flow ($W_f$), with increase in compressor discharge absolute pressure ($P_d$), than that afforded by any of the parallel lines A, B and C of FIGURE 4. When this is the case, the slope of lines A, B or C may be increased to lines A', B', or C' by tightening nut 134 of adjustment Y, or reduced to lines A", B", or C" by loosening nut 134, as mentioned in column 7 above. Here again, this adjustment, is to adapt a particular fuel regulator to meet the requirements of a particular model of engine, is also made at the factory.

After the factory adjustments X and Y have been made, as just described, the fuel regulator is tested on the engine, under actual flight conditions. Here, it will be found that a still further, fine adjustment of the slope of the metering curve must be made to meet actual flight requirements of the particular engine. This adjustment is made by loosening nut 236 and screwing in adjustable abutment 234 of adjustment Z, to increase the slope of the metering curve from that of A, B, or C to A', B' or C', or tightening said nut and screwing out 234 to decrease the metering curve from A, B or C to A", B" or C", as described in column 7 above. Curves B, B' and B" and C, C' and C" in FIGURE 3, show the effect of adjustments X, Y and Z on the curve of metering value position versus compressor discharge absolute pressure. Adjustment Z is the only field adjustment on my improved fuel control.

Figure 5:
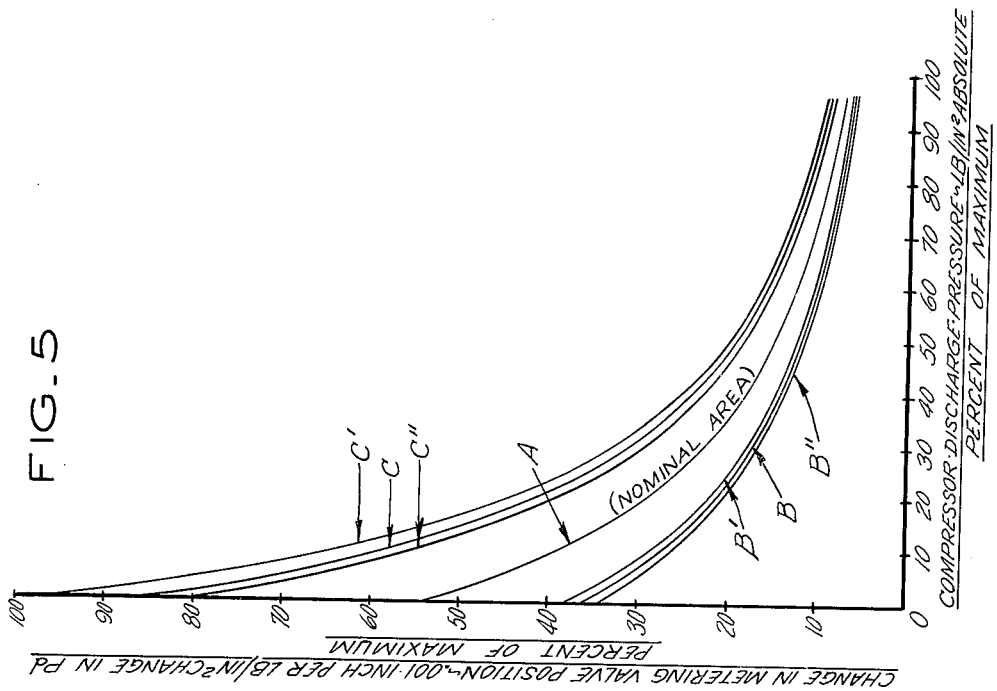

One of the principal novel features of my improved afterburner fuel control is the much higher sensitivity in the response of the metering valve positioning means to changes in compressor discharge absolute pressure, at low values than at high values of said pressure ($P_d$). This is graphically illustrated in FIGURE 5 which shows the changes in the position of metering valve 104 for a change of one pound per square inch (1.00 p.s.i.a.) in compressor discharge absolute pressure ($P_d$). Thus, the nominal area curve A (of FIGURE 5) shows the rapidly decreasing change in metering valve position, per 1.00 p.s.i. change in compressor discharge absolute pressure ($P_d$), as said pressure increases. Curve B shows the reducing effect of adjustment Y on the sensitivity of curve A, when the area is increased to a maximum and curve C shows the much greater increasing effect of adjustment X on the sensitivity of curve A, when area is reduced to a minimum. Curves B', B" and C', C" similarly show the effects of the slope adjustments Y and Z, on the sensitivity of curves B and C, respectively, as said slope adjustments are increased or decreased. This sensitivity performance is one of the striking features of the type of nutcracker amplifier shown in FIGURE 2; the advantage being approximately equal percentage sensitivity over the operating range of the fuel control.

Another novel feature of my improved afterburner fuel regulator is that the metering valve 104 is contoured, in relation to the metering valve position curves shown in FIGURE 3, so as to give the same difference in the rate of fuel flow for the same difference in compressor discharge absolute pressure ($P_d$), throughout the operating range of the engine, as indicated by the straight lines A, B and C of FIGURE 4.

*Operation*

In the amplifier A, the compressor discharge pressure is admitted to a bellows 146 that is matched with an evacuated bellows 144, so that absolute pressure is sensed. If the pressure increases, the upward motion of the plate 140 between the two bellows is transmitted to the floating lever arm 114 of the nutcracker by a rod 136. The floating arm 114 then rotates counterclockwise, pivoting on the rollers 116, and moves the servo valve 170 down. Filtered servo fuel is thus admitted at the left of the power piston 182, and the metering valve 104 is opened, increasing fuel flow. The rollers 116, rigidly attached to the metering valve 104 and power piston 182, are also moved to the right, and the floating arm 114 is thus restored to its equilibrium position. The upper track 112 is rigidly fixed in the housing 100. The floating arm 114 is restrained from motion parallel to the metering-valve axis by the yoke 122. The restoration of the floating lever 114 to its equilibrium position returns the servo valve 170 also to null.

A reduction in compressor discharge absolute pressure ($P_d$) will reverse the above operation, reducing fuel flow.

Since the pump 52 is a constant displacement type, fuel is by-passed back to the inlet side of pump 52 in the main fuel system to permit flow quantity regulation. The amount of flow by-passed, and therefore the amount of flow to the regulator, is determined by the metering head ($P_2-P_3$) across the metering valve 104. The metering head ($P_2-P_3$) is sensed across a diaphragm 208. If its value increases above the set value, $P_2$ will be high relative to $P_3$, and the diaphragm 208 will be deflected to the right, carrying with it the attached pilot valve 210. Normally the control pressure $P_c$ in chamber 228 is obtained from pressure ($P_2$) in chamber 206, but when valve 210 is closed, the control pressure $P_c$ in chamber 228 is obtained from pressure ($P_3$), through passage 218. The closing of valve 210 by the deflection of diaphragm 208 to the right will reduce pressure from $P_2$ on the left side of the diaphragm to the control pressure $P_c$, and the result will be a lower $P_c$. When $P_c$ is lowered with respect to $P_2$, the by-pass valve 224 will be opened. With more flow by-passed, less is available at the metering valve 104, and the metering head ($P_2-P_3$) will decrease. This procedure will be continued until the value of metering head ($P_2-P_3$) has been restored to the set value. In case the metering head should be decreased below the set value, the functioning outlined would be reversed.

The magnitude of the metering head ($P_2-P_3$) which the control will hold depends on the load on the spring 226 inside the by-pass valve 224. Balance is achieved when upstream pressure ($P_2$) times the diaphragm 208 area equals the sum of downstream pressure ($P_3$) times said diaphragm area and the force of spring 232: the load on this spring is adjusted externally by adjustable abutment 234 and nut 236, and it is used to provide a proportional control as discussed above.

The transfer valves 240 and 242 constitute one of the novel features of my improved afterburner fuel control. In the normal afterburning condition, the upstream and downstream pressures are maintained in the upper and lower spools respectively of both of these valves. When the control is to shut down the afterburner electrically, the valve 240 is moved down by the solenoid 262. The pressure $P_3$ is then no longer admitted to the by-pass valve 224, and the control pressure ($P_c$) is reduced to the pressure ($P_b$) upstream of pump 48; the fuel pressure ($P_2$) upstream of the by-pass valve 224 will open this valve so that all the output of pump 52 will be by-passed.

As shown in FIG. 2, valve 240 is in its down ("On") position, wherein passage 202 is connected to passage 204 and the pressure ($P_2$) in passage 202 is transmitted through passage 204 to chamber 206 on the left of diaphragm 208, and passage 216 is connected to passage 218, so that pressure ($P_3$) is transmitted from passage 216 through passages 218 and 220 to chamber 222 on the right of diaphragm 208. When valve 240 moves up to its "Off" position, its middle land moves up to a point between the ports of passages 202 and 204, thereby shutting off communication between said passages; and the lower land of valve 240 moves up to a point between the ports of passages 216 and 218 thereby shutting off communication between said passages.

Also, as shown in FIG. 2, valve 242 is in its up ("On") position, wherein passage 200 is connected to passage 202, and pressure ($P_2$) in passage 200 is transmitted to passage 202, at the same time, passage 250 is connected to passage 252, so that the pressure ($P_1$) in passage 250 is transmitted through passages 252 and 254 to cylinder 246; and again at the same time, passage 214 is connected to passage 216, so that pressure ($P_3$) in passage 214 is transmitted to passage 216.

When valve 242 moves down to its "Off" position, its top land moves down to a point between the ports of passages 200 and 202 and shuts off communication between said passages; the upper middle land moves down to a point opposite the port of passage 250, cutting off communication between passages 250 and 252; the lower middle land of valve 242 moves down to a point between the ports of passages 214 and 216, cutting off communication between said passages and connecting passages 214 and 252, whereby pressure ($P_3$) in passage 214 is transmitted through passages 252 and 254 to cylinder 246; and the bottom land of valve 242 moves down and connects passage 216 to the lower end of the cylinder in which valve 242 reciprocates, by virtue of the diametrically enlarged bottom portion of said cylinder, whereby the pressure ($P_3$) in passage 216 is reduced to boost pressure ($P_b$) by drainage through an axial passage in valve 242, and passages 258 and 260.

The pilot's manual control 244, 268 includes a mechanical override for the electrical shutdown. Turning the lever 244 to the "Off" position raises the valve 242, again shutting off the downstream pressure to the by-pass valve 224, admitting pressure ($P_b$), and shutting down the afterburner as before.

Valve 242 includes a means for shutting down the afterburner even if the by-pass valve 224 should stick in the closed position. During normal operation, pump interstage pressure ($P_1$) is admitted below the shut-off valve 108. When the afterburner is turned off by the manual override, pressure ($P_3$) is admitted below the shut-off valve 108. With the hydraulic pressures thus equalized on either side of valve 108, the strong spring 248 will take over to close it positively, and thus to shut down the afterburner even though the by-pass valve 224 should be stuck in the closed position.

The shut-off valve 108 is spring loaded to close when pressure ($P_3$) is introduced into cylinder 246 below valve 108. The pressure ($P_3$) in passage 106 is ordinarily sufficient to hold valve 108 open against the pressure ($P_1$) and the force of spring 248. If the pressure level in the control should drop sufficiently, the intermediate pressure ($P_1$) plus spring 248 would overcome pressure ($P_3$), in passage 106 and the valve 108 would be closed sufficiently to maintain pressure in the control at the desired value. This provision insures reliable operation of the afterburner in flight conditions where pressure at the afterburner nozzles 32 may be less than the pressure ($P_2$) minus metering head ($P_2$–$P_3$); without the interposition of valve 108, bypassing would be impossible under these circumstances.

During afterburner shut-down, the pressure ($P_3$) is introduced behind the shut-off valve 108. With the pressures on either side of this valve thus equalized, the spring 248 will close it. This will take place even if the by-pass valve 224 should remain stuck in the closed position.

The minimum flow stop 128 is adjustable externally to stop the metering valve 104 at any desired value of minimum flow from no flow (stop not reached) to the preselected minimum fuel flow.

In the design of my improved afterburner fuel control, the basic philosophy is to achieve the lightest possible weight and size compatible with reliability, accuracy, and ease of maintenance.

While I have shown and described the preferred embodiment of my invention, it should be understood that I do not limit the invention to the particular details of construction disclosed by way of illustration, as these may be changed and modified by those skilled in the art without departing from the spirit of my invention or exceeding the scope of the appended claims.

I claim:

1. For use with an aircraft turbojet engine having an air compressor, a main combustion chamber, a gas turbine, an afterburner combustion chamber for reheating the exhaust gases from said turbine, a fuel pump for supplying fuel to said main and afterburner chambers, and a main fuel control for automatically regulating the supply of fuel to said main combustion chamber solely in accordance with the unmodified, absolute discharge pressure of said compressor; an afterburner fuel control apparatus for controlling the total flow of fuel from said pump to said afterburner chamber solely in accordance with said pressure, comprising a fuel flow metering valve, first means, actuated by said pressure, for varying the flow area through said valve solely in accordance with varying values of said pressure throughout the operating range of said apparatus; said second means including a by-pass valve for returning fuel not passing through said metering valve to the inlet side of said pump; the opening of said by-pass valve being responsive to the differential between the discharge pressure of said pump and a control pressure which is regulated by means responsive to the pressure differential across said metering valve; said afterburner fuel control having means for shutting off the fuel flow to said afterburner chamber, at the will of the aircraft pilot, comprising: a first transfer valve, operated by a solenoid and an electrical switch, whereby the pilot may energize or deenergize said solenoid by moving said switch to an "On" or "Off" position; said transfer valve being so arranged that, when said solenoid is so deenergized said transfer valve cuts off fuel flow from downstream of said metering valve to said by-pass valve, and reduces said control pressure to fuel pressure upstream of said pump, whereupon said by-pass valve moves to full open position, so that all of the fuel delivered by said fuel pump is recirculated, and no fuel flows from said control apparatus to said afterburner chamber.

2. An afterburner fuel control apparatus according to claim 1, having mechanical means, operable manually by the aircraft pilot, for overriding the action of said first means, comprising a second transfer valve, a manual control lever, and means whereby, when the pilot places said lever in "Off" position, said second transfer valve operates in the same manner as specified in claim 1 for said first transfer valve; so that all the fuel delivered by said pump is recirculated, and no fuel flows from said control apparatus to said afterburner chamber.

3. An afterburner fuel control apparatus according to claim 2, having means for shutting off the fuel flow from said fuel control apparatus to said afterburner chamber, in the event said second transfer valve should stick in its closed position, comprising: a metered fuel flow shut-off valve, biased toward closed position by a spring, acting in opposition to fuel under pressure, downstream of said metering valve, applied to the opposite face of said shut-off valve; and means whereby, when said second transfer valve is in its "Off" position, as specified in claim 2, fuel under pressure downstream of said metering valve is applied to said shut-off valve, so as to augment the force of said spring; whereby the fuel pressures on opposite sides of said shut-off valve are equalized, said shut-off valve is positively closed by said spring, and all fuel flow to said afterburner chamber is shut off, even though said by-pass valve should be stuck in closed position.

4. An afterburner fuel control apparatus according to claim 3, having means, operable only when said metered fuel flow shut-off valve is closed, to drain fuel downstream thereof to the outside of said apparatus.

References Cited by the Examiner

UNITED STATES PATENTS

| 2,555,445 | 6/51 | Hooker et al. | |
| 2,581,275 | 1/52 | Mock | 60—39.28 X |
| 2,675,674 | 4/54 | Lee II. | |
| 2,700,275 | 1/55 | Chandler et al. | 60—39.28 X |
| 2,742,755 | 4/56 | Davies et al. | 60—35.6 |
| 2,759,549 | 8/56 | Best | 60—39.28 X |
| 2,764,868 | 10/56 | Watson et al. | 60—39.28 |
| 2,841,957 | 7/58 | Thorpe et al. | 60—39.28 |
| 2,909,896 | 10/59 | Porter | 60—39.28 |

FOREIGN PATENTS

| 646,780 | 11/50 | Great Britain. |
| 158,930 | 5/57 | Sweden. |

JULIUS E. WEST, *Primary Examiner.*

SAMUEL LEVINE, *Examiner.*